United States Patent
Judd et al.

[15] 3,638,096
[45] Jan. 25, 1972

[54] CONSTANT FREQUENCY DC TO DC CONVERTER WITH OSCILLATION SUSTAINING VOLTAGE REGULATION FEEDBACK LOOP

[72] Inventors: Frank Fuller Judd, Madison; Jan Mark Lieberman, Lake Hiawatha; Helmut Wilhart, Whippany, all of N.J.

[73] Assignee: Bell Telephone Laboratories Incorporated, Murray Hill, N.J.

[22] Filed: Dec. 21, 1970

[21] Appl. No.: 100,151

[52] U.S. Cl................................................321/19, 321/2
[51] Int. Cl..........................................................H02m 1/08
[58] Field of Search...........................................321/2, 18, 19

[56] References Cited

UNITED STATES PATENTS

| | | | |
|---|---|---|---|
| 3,119,057 | 1/1964 | Wilson | 321/19 |
| 3,219,906 | 11/1965 | Keller et al. | 321/2 X |
| 3,325,716 | 6/1967 | Gomi | 321/2 |
| 3,373,334 | 3/1968 | Geisz et al. | 321/2 |
| 3,402,342 | 9/1968 | Wagner | 321/2 X |
| 3,432,737 | 3/1969 | Hunter et al. | 321/2 |
| 3,461,374 | 8/1969 | Rhyne, Jr. | 321/19 X |

Primary Examiner—William M. Shoop, Jr.
Attorney—R. J. Guenther and E. W. Adams, Jr.

[57] ABSTRACT

A self-oscillating DC to DC power converter establishes oscillations in the inverter through the voltage regulating feedback circuit. Its frequency of oscillation is regulated by a frequency regulation feedback circuit which controls the hysteresis response of the voltage regulating feedback circuit.

5 Claims, 4 Drawing Figures

INVENTORS F. F. JUDD
J. M. LIEBERMAN
H. WILHART

BY Alfred L. Steinmetz
ATTORNEY

3,638,096

CONSTANT FREQUENCY DC TO DC CONVERTER WITH OSCILLATION SUSTAINING VOLTAGE REGULATION FEEDBACK LOOP

BACKGROUND OF THE INVENTION

This invention relates to DC to DC converters and, more particularly, to self-oscillating DC to DC converters. It is specifically concerned with a DC to DC converter in which oscillations are established by means of feedback signals transmitted via the voltage regulation feedback loop.

Conventional self-oscillating DC to DC converters, such as the one disclosed in FIG. 1, utilize transformer feedback to generate the nonlinear feedback signals which establish the oscillations in the inverter circuit. The inverter feedback circuit 15 includes a transformer winding 16 magnetically coupled to the primary winding 11 of the inverter 10. The inverter 10 typically comprises push-pull coupled switching devices which alternately conduct to invert a DC signal, applied to input terminals 1 and 2, to an AC signal at the output transformer winding 12. The inverter feedback 15 generates nonlinear oscillating signals in response to the inverter output which sustain the alternate switching of these switching devices.

The magnitude of the DC voltage output of the converter supplied to the output load 5 is controlled by a voltage regulation feedback loop 21 including the modulation control 20 which controls the duty cycle of the switching devices in the inverter 10. The feedback arrangement establishing oscillations in the inverter 10 is distinct and physically separate from the voltage regulation feedback loop 21. This conventional converter circuit requires a multiwinding inverter transformer since additional windings are needed to supply the feedback signals establishing oscillations in the inverter.

It is therefore an object of the invention to establish the oscillations in the inverter of a DC to DC converter by means of feedback signals supplied by the voltage regulation loop.

The utilization of the voltage regulation feedback loop to establish oscillations in the inverter may cause the frequency of switching of the inverter to change in response to variations of several parameters, such as the output load of the converter. A variation in frequency to a lower value than desired necessitates the utilization of a larger magnetizing inductance than would otherwise be needed in the output transformer of the inverter.

It is therefore another object of the invention to operate the inverter circuit of a self-oscillating converter at a constant frequency independently of variations in the output load or other parameters.

It is yet another object of the invention to reduce the circuit complexity of a self-oscillating DC to DC converter by simplifying the inverter output transformer requirements and eliminating the need for discrete frequency control circuitry.

SUMMARY OF THE INVENTION

The above objects are achieved in accord with the principles of the invention by utilizing the voltage regulation feedback loop to establish self-oscilla,ions which, with the aid of switching logic circuitry, control the switching devices in the inverter circuit. The voltage regulation feedback loop responds to variations in the output load voltage of the converter and feeds back control signals to a bistable trigger circuit whose output controls the duty cycle of the active switching devices in the inverter. The output of the bistable trigger in turn activates a binary signal steering circuit which is coupled to and alternately transmits the switch drive signal to the oppositely phased switching devices in the inverter. This arrangement establishes the nonlinear oscillations required to operate the inverter, in addition to controlling the duty cycle of the inverting switching devices.

The bistable trigger circuit, included in the voltage regulation feedback loop, has a hysteresis response to the voltage feedback signal. That is, the threshold of the input signal at which the bistable trigger circuit changes state is dependent upon the direction of change as well as the magnitude of the input signal. The magnitude difference between the threshold of a decreasing and the threshold of an increasing input signal is the hysteresis width of the bistable trigger circuit. A frequency detector circuit monitors the switching frequency of the inverter and generates a frequency error signal which is utilized to control the hysteresis width of the bistable trigger circuit. The control of the hysteresis width of the trigger circuit determines the frequency at which the switching devices in the inverter circuit alternate.

It is apparent that this arrangement advantageously eliminates the need for independent circuitry to establish oscillations in the inverter circuit and thus improves the response and economy of the DC to DC converter of the invention over comparable converters in the prior art.

BRIEF DESCRIPTION OF THE DRAWINGS

The invention may be readily understood with reference to the following detailed description and the attached drawings wherein.

DETAILED DESCRIPTION

Figure 1:
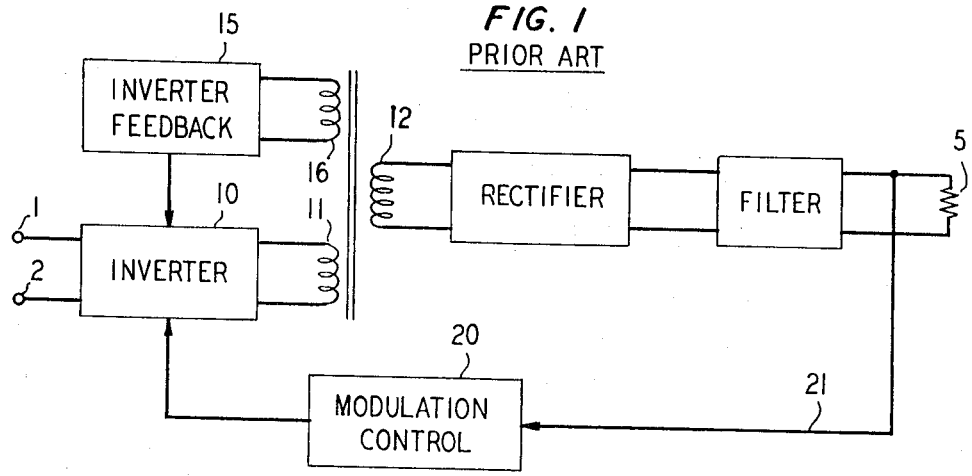
FIG. 1 is a block diagram of a conventional DC to DC converter circuit and which is described hereinabove.
Figure 2:
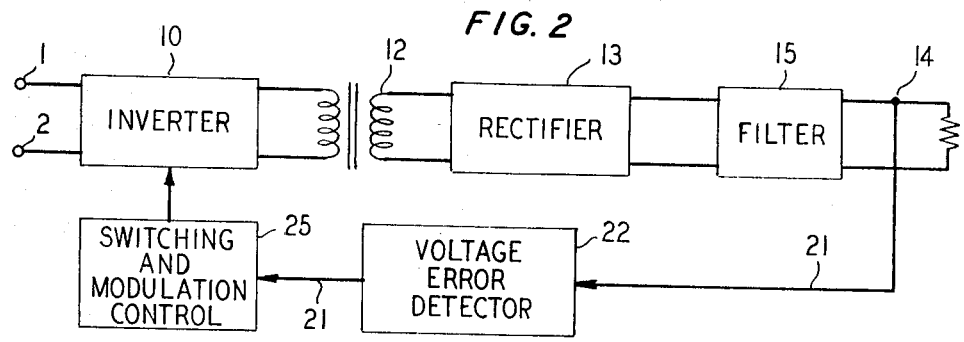
FIG. 2 is a block diagram of a DC to DC converter circuit in which the inverter oscillations are sustained by utilization of feedback signals in the voltage regulation feedback loop.

The voltage regulated DC to DC converter disclosed in FIG. 2 establishes the alternate switching of the inverter 10 by means of the feedback signals of the voltage regulation feedback loop. The DC voltage to be converted is coupled to the input terminals 1 and 2 of the inverter circuit 10. The inverter 10, by means of switching action stimulated by the voltage regulation feedback loop, transforms this DC voltage into an AC signal which appears at the transformer secondary winding 12. The transformer action permits the magnitude of the AC voltage to be changed to another magnitude. The AC voltage of the transformer secondary 12 is rectified by a of 13. A low-pass filter 15 blocks the transmission of high-frequency components of the rectified signal to the output load 17.

The output voltage is monitored and controlled by means of a voltage regulation feedback loop 21 which is coupled to the output lead 14. The voltage regulation feedback loop 21 includes a voltage error detector 22 and a switching and modulation control 25 which is coupled to the switching devices of the inverter 10. The voltage error detector 22 monitors the voltage at the output 14 and compares it to an internal reference voltage. An error voltage is generated from this comparison and applied to the switching and modulation control 25.

The switching and modulation control 25 comprises a bistable trigger circuit which functions as a level detector and logic circuitry to steer the detector output signal to alternate ones of the switching devices of the inverter circuit 10. The bistable trigger circuit responds to the increase and decrease of the voltage feedback signal by generating a drive signal with appropriate duty cycle for the active switching devices of the inverter 10. The logic circuitry applies this drive signal to alternate ones of the switching devices of the inverter 10.

Variations in the output load and other parameters may have a direct effect on the switching frequency of the inverter 10. This is undesirable in a transformer-coupled converter since the inverter transformer is required to have sufficient magnetizing inductance to accommodate the lowest switching frequency which is likely to be encountered. To permit efficient utilization of the inverter transformer it is essential that the inverter be operated at a constant frequency.

Figure 3:
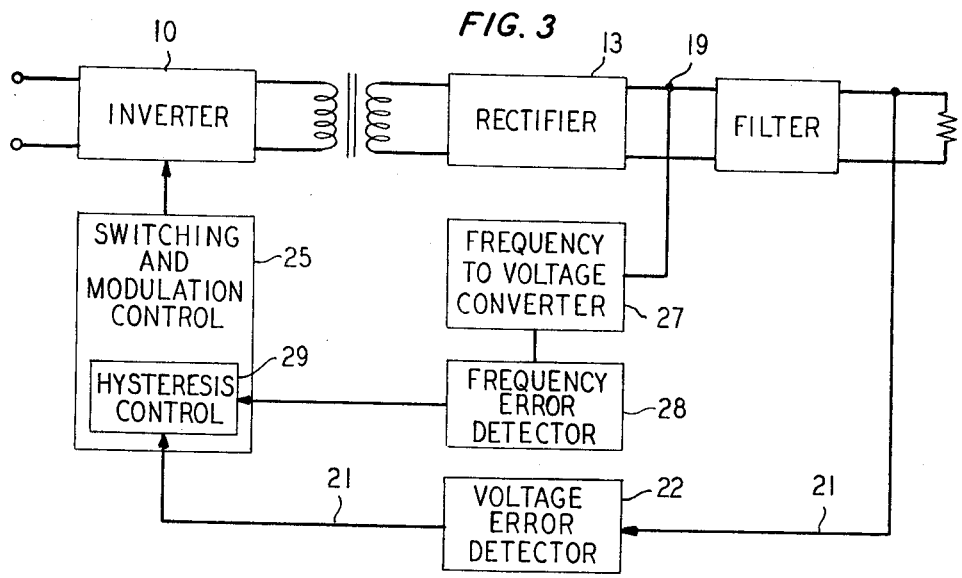
FIG. 3 is a block diagram of a DC to DC converter in which the frequency of switching in the inverter circuit is controlled by a frequency control arrangement.

The inverter of the DC to DC converter, disclosed in FIG. 3, is operated at a substantially constant frequency by adding a frequency control feedback circuit to the feedback circuitry controlling the switching of the inverter circuit 10. The frequency control feedback circuit includes a frequency-to-voltage converter 27 coupled to the output 19 of the rectifier 13 and a frequency error detector 28. The frequency error detector 28 compares the voltage from converter 27 to an internal reference voltage and generates a frequency error signal therefrom. This frequency error signal is applied to the hysteresis control circuit 29 included in the switching and modulation control 25. The hysteresis control circuit 29 controls the upper and lower triggering signal levels at which the switching and modulation control 25 responds to the error voltage signal of the voltage error detector 22. Since the difference between the upper and lower triggering levels or hysteresis width of the bistable trigger circuit included in the switching and modulation control 25 is directly related to the oscillating frequency of the voltage regulator feedback circuit, it is apparent that through control of this hysteresis width the oscillating frequency of the voltage control feedback circuit 21 can be controlled. This frequency control advantageously permits the use of the voltage regulation feedback loop 21 to sustain switching at a constant frequency in the inverter circuit 10.

Figure 4:
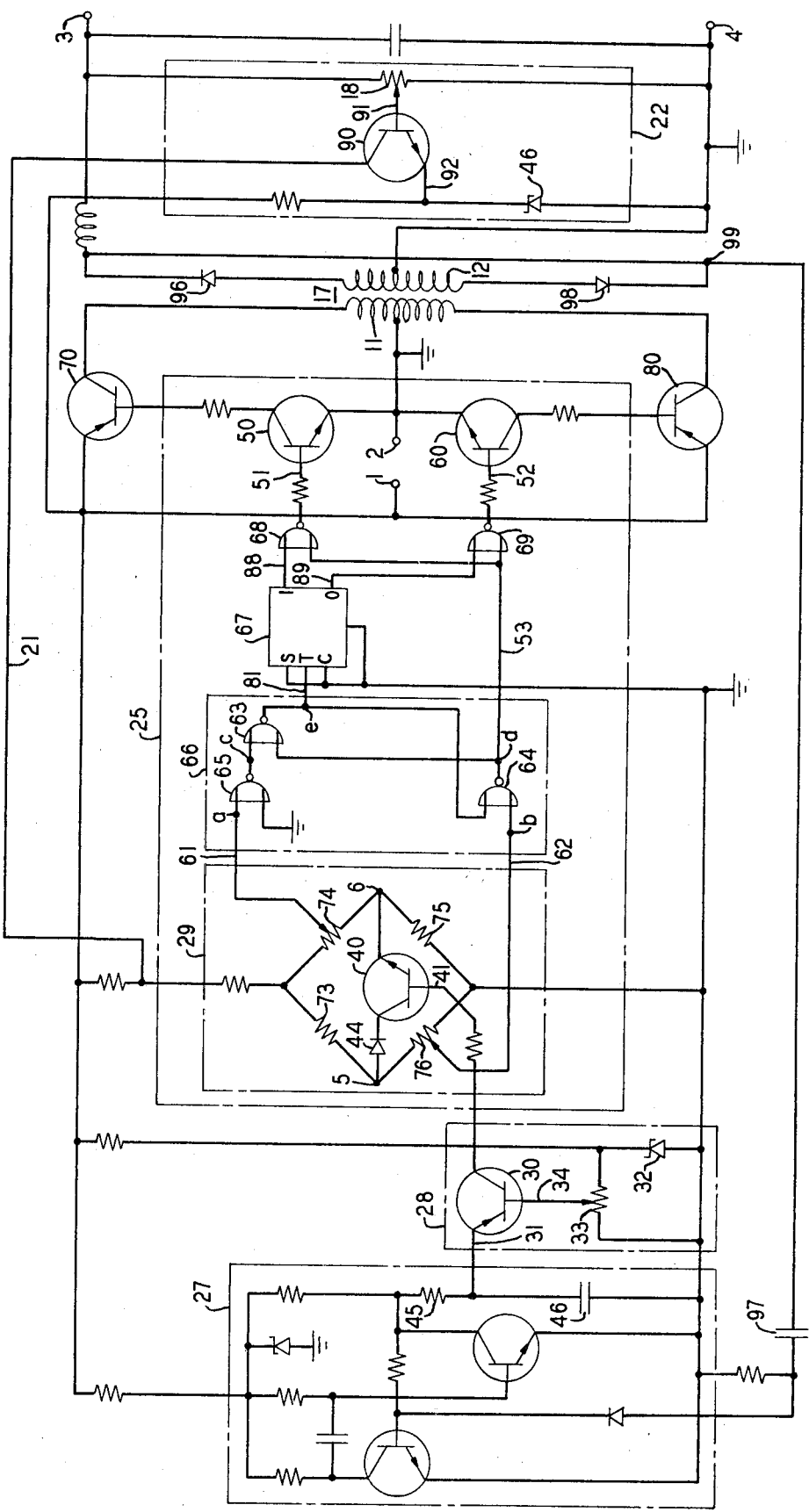
FIG. 4 is a schematic diagram of a DC to DC converter circuit including feedback arrangements in accord with the principles of the invention to regulate the output voltage and frequency of switching and establish inverter oscillations in the DC to DC converter circuit.

A self-oscillating DC to DC converter is shown schematically in FIG. 4 in which a DC voltage, of one voltage level, applied to the input terminals 1 and 2 is converted to another voltage level at the output terminals 3 and 4. The voltage levels are converted by transformer action and duty cycle control of the inverter switching devices. The alternate switching of the inverter switching transistors 70 and 80 inverts the DC input voltage into an AC voltage by alternately energizing the inverter transformer 17 in opposite directions. The switching of transistors 70 and 80 is controlled by the switching and modulation control 25 which applies bias signals to transistors 70 and 80, via the driving transistors 50 and 60.

The frequency of the switching of transistors 70 and 80 is controlled in response to the frequency-to-voltage converter 27 and the frequency error detector 28. The error signal generated by the frequency error detector 28 is applied to the hysteresis control 29 which is a part of the bistable trigger circuit contained in the switching and modulation control 25 and serves to control its hysteretic response to the voltage control feedback signals of the converter. The hysteresis width is automatically altered continuously to maintain the inverter switching frequency of the converter at some constant value.

The principles of the invention may be readily understood by explaining the operation of the voltage and frequency regulation feedback circuits in the illustrative embodiment of the converter. The output voltage at terminals 3 and 4 of the converter is regulated in response to a voltage error detector 22 which monitors the output voltage and compares it to an internally generated reference voltage. The voltage error detector 22 generates an error voltage in response to this comparison which is proportional to the difference between the output and reference voltages. The voltage error detector 22 comprises a potentiometer 18, which is shunted across the output terminals 3 and 4. A transistor 90 has its base electrode 91 connected to the wiper arm of the potentiometer 18. The emitter electrode 92 of transistor 90 is connected to a breakdown diode 46. The breakdown diode 46 is energized by the input voltage at terminal 1 and establishes a reference voltage. The conductivity of transistor 90 is proportional to the difference between the voltage at the wiper arm of potentiometer 18 and the reference voltage of breakdown diode 46.

The collector voltage of transistor 90 is applied, via the feedback lead 21, to a hysteresis control circuit 29. The hysteresis control circuit controls the magnitude of the feedback signal applied to leads 61 and 62 in the switching and modulation control 25. These respective magnitudes control the hysteretic response of the switching and modulation control 25 as described below.

The hysteresis control circuit 29 includes a bridge circuit comprising the resistors 73 and 75 and the potentiometers 74 and 76. The impedance of the potentiometers 74 and 76 is somewhat greater than the impedance of the resistors 73 and 75. It is apparent that when the transistor 40 whose collector-emitter path connects nodes 5 and 6 of the bridge is not conducting, the potential at node 5 will exceed the potential at node 6. With transistor 40 not conducting, the potentiometers 74 and 76 are adjusted so that the fractions of the feedback voltage applied to leads 61 and 62 in the switching and modulation control 25 are just slightly different. This is to establish the minimum possible hysteresis width at the desired mean triggering level of the switching and modulation control 25. It is apparent that conduction of transistor 40 will always cause the fraction of the feedback voltage applied to lead 61 to exceed the fraction of the feedback voltage applied to lead 62.

The conductivity level of the transistor 40 connecting nodes 5 and 6 of the bridge controls the difference between the fractions of the feedback voltage applied to leads 61 and 62. The bistable switching circuit 66 included in the switching and modulation control 25 in conjunction with the hysteresis control 29 has a hysteretic switching characteristic as long as the voltage at lead 61 always exceeds the voltage at lead 62. It is apparent that by controlling the conductivity of transistor 40, the hysteretic response of the bistable trigger circuit comprising the hysteresis control 29 and the bistable switching circuit 66 can be directly controlled. The diode 44 is included in the collector path of transistor 40 to prevent the base drive current of transistor 40 from returning to ground via the collector path.

In addition to the hysteresis control 29 and the bistable switching circuit 66, the switching and modulation control 25 comprises a JK flip-flop 67, and two NOR-gates 68 and 69 which function as a steering circuit to direct the output of the bistable switching circuit 66 to the appropriate driving transistors 50 and 60. The NOR-gates 68 and 69 are operated in response to the state of the output of the bistable switching circuit 66 and the output of the JK flip-flop 67. The bistable switching circuit 66 comprises the three NOR-gates 63, 64 and 65. Two of the NOR-gates 63 and 64 are cross-connected to form a set/reset flip-flop. A third NOR-gate 65 serves as an inverting input in one of the trigger lines of NOR-gate 63. As described above, the switching characteristics of the bistable trigger circuit comprising the bistable switching circuit 66 and the hysteresis control 29 has a hysteretic response to the voltage regulation feedback signal as long as the fraction of the feedback voltage applied to lead 61 exceeds the fraction of the feedback voltage applied to lead 62. This hysteretic response may be readily ascertained by a logical analysis of the sequential response of the NOR-gates 63, 64 and 65 to the fractions of the feedback voltage applied to leads 61 and 62. An understanding of the operation of the bistable switching circuit 66 may be readily acquired by an examination of the following table which describes the response of the bistable switching circuit 66 in terms of the equivalent logic values of the input and output signals. A signal with a 1 logic value exceeds the input threshold of the NOR gate while a 0 signal is below this threshold. The lower case letters at the top of the columns in the following table identify the various leads in the switching circuit identified by the same lower case letter in FIG. 4.

| States | Terminals | | | | |
|---|---|---|---|---|---|
| | a | b | c | d | e |
| 1 | 0 | 0 | 1 | 1 | 0 |
| 2 | 1 | 0 | 0 | 1 | 0 |
| 3 | 1 | 0 | 0 | 0 | 1 |
| 4 | 1 | 0 | 0 | 0 | 1 |
| 5 | 0 | 0 | 1 | 1 | 0 |

The output signal at the terminal e or lead 87 of the bistable switching circuit 66 is applied to a JK flip-flop 67. The JK flip-flop 67, whose output changes state in response to an input to the toggle input lead 87, has its two output leads 88 and 89 connected to the NOR-gates 68 and 69. The JK flip-flop 67 is a general-purpose bistable trigger circuit which, under certain operating conditions, may be used as a toggle switch, as used herein, by grounding its set and clear input terminals. The JK flip-flop is well known in the art and it is not believed necessary to describe it in detail. A description of the JK flip-flop may be found in *The Integrated Circuit Data Book*, Motorola Semiconductor Products Inc., 1st Edition, Aug. 1968, Pages 10–27.

The complementary outputs of the JK flip-flop on leads 88 and 89 change state every time the output of the bistable switching circuit 66 on lead 87 assumes a low-voltage state, provided that the set and clear inputs to the flip-flop are grounded as shown in FIG. 4. Since the outputs of the JK flip-flop on leads 88 and 89 are complementary, it is apparent that the NOR-gates 68 and 69 are alternately enabled by signals representative of logic zeros to transmit signals to the base electrodes 51 and 52 of transistors 50 and 60, respectively. The output terminals of the enabled NOR-gates 68 and 69 alternately assume logic 1 levels in response to logic 0's appearing at lead 53 of the bistable switching circuit 66, thereby furnishing drive signals to the base electrodes 51 and 52. This serves to alternately drive the transistors 50 and 60 into saturation. The saturated transistors 50 and 60 in turn alternately drive the inverter switching transistors 70 and 80 into saturation. With the state of the JK flip-flop, as indicated by the respective 1 and 0 shown within the enclosed box 67 in FIG. 4, the NOR-gate 68 is enabled to respond to a logic 0 on lead 53.

As the output voltage across terminals 3 and 4 decreases in value, the collector voltage of transistor 90 increased due to its decreased conductivity. The fraction of this increasing voltage applied to the terminal 62 of the bistable switching circuit 66 crosses a threshold at which the outputs of the bistable switching circuit change state. The output at terminal 87 will assume a high voltage state. The complementary output at terminal 53 will assume a low voltage state. This low voltage state causes the output of NOR-gate 68 to assume a high voltage state thereby furnishing a drive signal to the base 51 of the transistor 50. The transistor 50 is driven into saturation and in turn drives the switching transistor 70 into saturation.

With transistor 70 conducting the input voltage is applied to the primary winding 11 of the transformer 17. The induced voltage appearing across the secondary winding 12 is rectified by one of the diodes 96 and 98 and applied across the output terminals 3 and 4. As the output voltage increases in magnitude, the collector voltage of transistor 90 decreases. The fraction of this decreasing voltage applied to lead 61, which is determined by the hysteresis control, passes the threshold level of gate 65 and causes the bistable switching circuit 66 to change state. The bistable switching circuit 66 applies a low level signal to the toggle input of the JK flip-flop 67 via lead 87 causing it to change state, reversing the indicated 1 and 0 in FIG. 4. Hence the next transition to a low-voltage state occurring at lead 53 will cause the output of the now enabled NOR-gate 69 to assume a high-voltage state thereby furnishing a drive signal to the base 52 of transistor 60. The transistor 60 saturates and drives the alternate switching transistor 80 into saturation. It is apparent from the preceding description that the independent switching frequency of each of the transistors 70 and 80 will be exactly one-half of the ripple frequency of the output signal of the converter at terminals 3 and 4.

As indicated above, the frequency of switching of the inverter of the converter tends to vary with changes in the output load and with changes in the input voltage. These changes in frequency are undesirable because of the extra magnetizing inductance which is needed in the inverter transformer to accommodate the lowest frequency which is likely to be encountered. The frequency of switching hence is regulated by including in the converter a frequency regulation feedback circuit which has the hysteresis control 29 in common with the voltage regulation feedback loop, as described hereinbelow. The frequency regulation feedback circuitry is activated in response to the switching frequency which is detected at the node 99. The node 99 is contiguous to the rectifier diode 98 connected to the output transformer winding 12.

The pulse signal occurring at node 99 in response to the switching of the inverter is differentiated by the capacitor 97. The trigger signal occurring therefrom is applied to the frequency-to-voltage converter 27. The frequency-to-voltage converter 27 comprises a monostable pulsing circuit whose output is connected to an integrating circuit comprising the integrating resistor 45 and the integrating capacitor 46. The average voltage across the capacitor 46 is directly proportional to the switching frequency of the inverter. This voltage is applied to the frequency error detector 28.

The frequency error detector 28 comprises the transistor 30 and the breakdown diode 32. The breakdown diode 32, which is energized by the input voltage, generates a reference voltage, an adjustable fraction of which is coupled via potentiometer 33, to the base electrode 34 of transistor 30. Potentiometer 33 thereby affords a means of adjusting the inverter switching frequency, as described hereinbelow. The voltage across the capacitor 46 is coupled to the emitter 31 of the transistor 30. The collector voltage of the transistor 30 is directly proportional to the difference between the actual operating frequency of the inverter and the desired regulated frequency of the inverter which is established by the fraction of the magnitude of the breakdown voltage across the breakdown diode 32, which is applied to the base electrode 34 of transistor 30 via potentiometer 33.

The output voltage of the frequency error detector 28 is applied to the hysteresis control circuit 29. The magnitude of this voltage determines the hysteresis width established by the hysteresis control circuit 29. As described above, the system hysteresis of the converter is controlled to hold the switching frequency of the inverter constant. The frequency error signal of the frequency error detector 28 is applied to the base 41 of transistor 40. The magnitude of this signal controls the conductivity of transistor 40 connecting nodes 5 and 6 of the bridge circuit of the hysteresis control circuit 29. By controlling the conductivity of transistor 40, the hysteretic width between the upper and lower triggering levels of the bistable trigger circuit comprising the hysteresis control circuit 29 and the bistable switching circuit 66 is controlled in response to the deviation of the switching frequency of the inverter from its regulated value.

It is apparent from the foregoing description that the voltage error signal fed back to the hysteresis control circuit 29 establishes oscillations in the inverter circuit and controls the duty cycle of the switching transistors therein. The frequency regulation feedback circuit, through adjustment of the upper and lower triggering levels at which the switching and modulation control 25 responds, regulates the frequency of switching at some desired value.

What is claimed is:

1. A self-oscillating DC to DC power converter comprising
an inverter circuit including two switching devices,
a voltage regulating feedback circuit comprising
a bistable switching circuit with two output terminals having complementary output states,
a JK flip-flop arranged to switch output states in response to a change in state of signal applied to a single input, said toggle input connected to one of said output terminals of said bistable switching circuit,
a steering circuit comprising
two signal gates connected in parallel to the other output terminal of said bistable switching circuit, said signal gates being alternately enabled by the complementary outputs of said JK flip-flop and the two gate outputs being connected to said two switching devices, respectively,
a frequency regulating feedback circuit coupled to the output of said converter and including a frequency-to-voltage converter, a reference voltage to establish the regulated frequency, means to compare the voltage output of said frequency-to-voltage converter and said reference voltage to derive a frequency error signal therefrom, and a hysteresis control circuit to control the upper and lower triggering levels of said bistable switching circuit and responsive to said means to compare and derive whereby said voltage regulation feedback circuit establishes the switching of said switching devices and said frequency regulation feedback circuit regulates the switching frequency by controlling the hysteresis of the voltage regulation feedback circuit.

2. A self-oscillating DC to DC power converter as defined in claim 1 wherein said hysteresis control circuit comprises
a bridge circuit with potentiometers in opposing branch arms, the wipers of said potentiometers coupled to two input leads of a bistable switching circuit, and
a variable impedance coupled across the bridge to control the voltage difference between said two input leads of said bistable switching circuit.

3. A self-oscillating DC to DC power converter as defined in claim 2 wherein said means to compare and derive comprises
a breakdown diode energized by the input to said inverter, and
a transistor whose base is adjustably coupled to said breakdown diode and whose emitter is coupled to said frequency-to-voltage converter.

4. A DC to DC converter circuit comprising
input terminals,
output terminals,
voltage monitoring means coupled to said output terminals,
an inverter circuit coupled to said input terminals including at least two oppositely phased switching devices,
a feedback loop coupling said voltage monitoring means to said switching devices, said feedback loop including a hysteretic bistable trigger means and at least two gating means to couple the output of said trigger means to said switching devices,
a steering control toggle circuit to alternately enable said gate circuits in order to alternately apply drive signals to the appropriately phased switching devices, and
a frequency detector coupled to said inverter circuit and means responsive to said frequency detector to alter the hysteretic response of said bistable trigger means.

5. A DC to DC converter as defined in claim 4 wherein said bistable trigger circuit includes
a bistable switching circuit with two inputs and an input stage to couple different amplitudes of voltage feedback signals to said two inputs, and
said input stage responsive to said frequency detector to control the respective amplitudes of voltage applied to said two inputs.

* * * * *